(12) United States Patent
Sorrentino

(10) Patent No.: US 8,693,571 B2
(45) Date of Patent: Apr. 8, 2014

(54) METHODS AND APPARATUSES FOR MULTIPLE ACCESS IN A WIRELESS COMMUNICATION NETWORK USING DCT-OFDM

(75) Inventor: Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 549 days.

(21) Appl. No.: 12/913,119

(22) Filed: Oct. 27, 2010

(65) Prior Publication Data
US 2011/0222624 A1 Sep. 15, 2011

Related U.S. Application Data

(60) Provisional application No. 61/313,346, filed on Mar. 12, 2010.

(51) Int. Cl.
*H04L 27/00* (2006.01)

(52) U.S. Cl.
USPC .......................................................... 375/295

(58) Field of Classification Search
USPC ................................................. 375/299, 260
See application file for complete search history.

(56) References Cited

U.S. PATENT DOCUMENTS

2008/0095267 A1* 4/2008 Beaulieu et al. ............... 375/299

OTHER PUBLICATIONS

Al-Kamali et al., A New Single Carrier FDMA System Based on the Discrete Cosine Transform, Dec. 2009, Computer Engineering and System, ICCES, International Conference.*

Al-Kamali, F. S. et al. "A New Single Carrier FDMA System Based on the Discrete Cosine Transform." IEEE International Conference on Computer Engineering & Systems (ICCES 2009), Piscataway, NJ, USA, Dec. 14, 2009.
Cui, T. et al. "ML CFO and PO Estimation in DCT OFDM Systems under Non-Circular Transmissions." IEEE International Conference on Communications, 2007 (ICC '07), Glasgow, Scotland, Jun. 24-28, 2007, pp. 6275-6280.
De Frein, C. et al. "Precoded OFDM—An Idea Whose Time Has Come." Irish Signals and Systems Conference 2004, Belfast, Ireland, Jun. 30-Jul. 2, 2004, pp. 363-368.
Author Unknown. "WiMAX: E vs. D—The Advantages of 802.16e over 802.16d." Motorola White Paper, (c) 2005.
Author Unknown. "Long Term Evolution (LTE): Overview of LTE Air-Interface." Motorola White Paper, (c) 2007.

(Continued)

*Primary Examiner* — Chieh M Fan
*Assistant Examiner* — Wednel Cadeau
(74) *Attorney, Agent, or Firm* — Coats and Bennett, P.L.L.C.

(57) ABSTRACT

The present invention provides an advantageous transmitter apparatus and associated method, for generating a Single-Carrier Discrete Cosine Transform (SC-DCT) OFDM signal for transmission. These transmit-side innovations include circuit configuration and signal processing methods for mapping $K_u$ "input subcarriers" to N "output subcarriers," where the "output subcarriers" are some or all of the subcarriers defined for the SC-DCT OFDM signal. In one or more embodiments, $K_u$ is less than N, and the mapping is based on advantageous DCT/IDCT precoding. The present invention additionally or alternatively includes advantageous frequency-selective mapping, and further provides a corresponding receiver apparatus and associated method, for receiving and de-mapping the SC-DCT OFDM signals contemplated herein.

17 Claims, 8 Drawing Sheets

(56) References Cited

OTHER PUBLICATIONS

Wang, Z. et al. "Linearly Precoded or Coded OFDM against Wireless Channel Fades?" Third IEEE Signal Processing Workshop on Signal Processing Advances in Wireless Communications, Taoyuan, Taiwan, Mar. 20-23, 2001.

Shanlin, S. et al. "A Novel Method Based DCT to Reduce PAPR of OFDM Systems." 4th International Conference on Wireless Communications, Networking and Mobile Computing, 2008 (WiCOM '08), Tianjin Univeristy, Tianjin, Oct. 12-14, 2008, pp. 1-5.

Al-Dhahir, N. et al. "Optimum DCT-Based Multicarrier Transceivers for Frequency-Selective Channels." IEEE Transactions on Communications, vol. 54, No. 5, May 2006.

Myung, H. G. et al. "Single Carrier FDMA for Uplink Wireless Transmission." IEEE Vehicular Technology Magazine, Sep. 2006.

Tan, P. et al. "A Comparison of DCT-Based OFDM and DFT-Based OFDM in Frequency Offset and Fading Channels." IEEE Transactions on Communications, vol. 54, No. 11, Nov. 2006.

\* cited by examiner

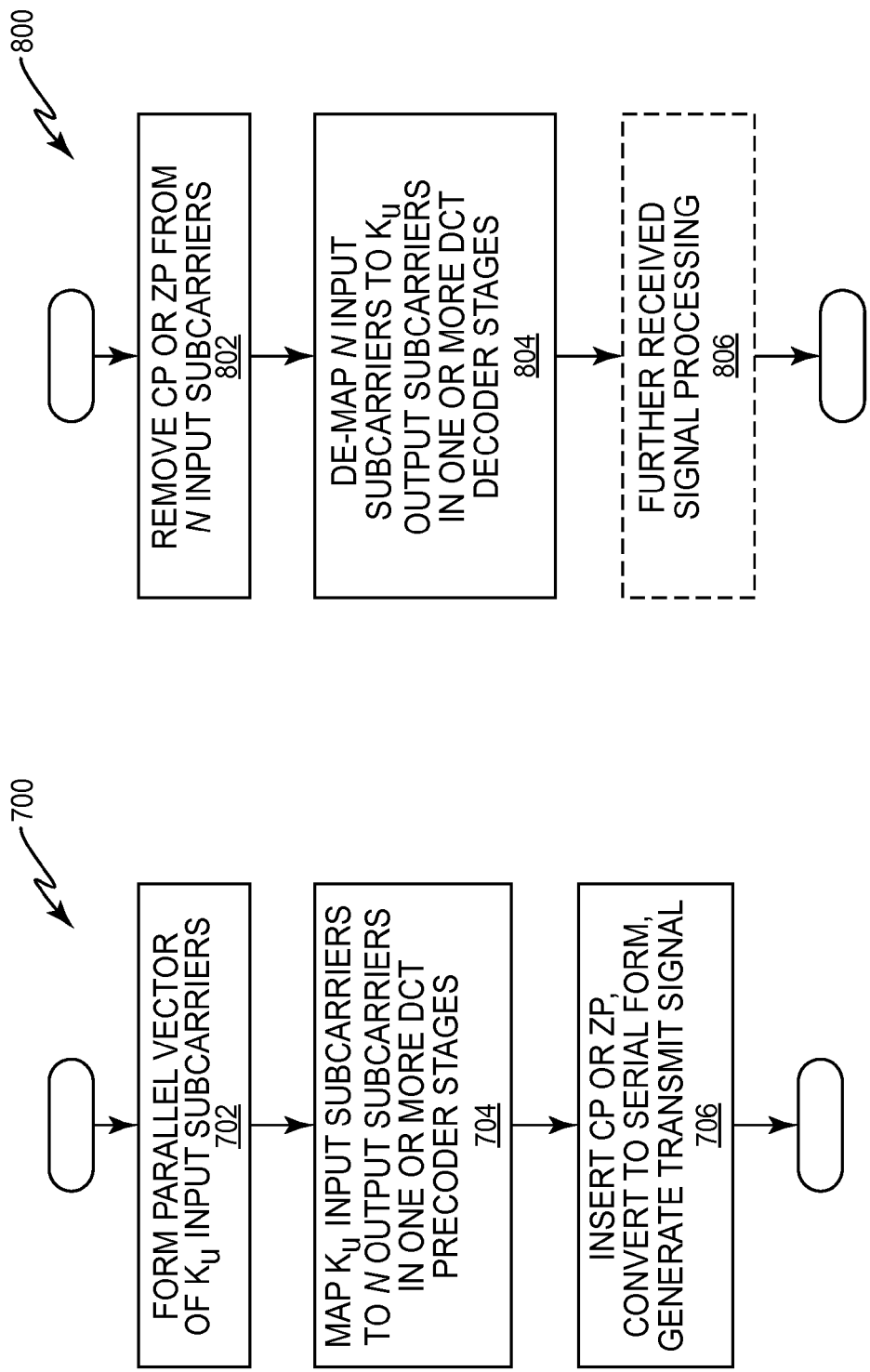

METHODS AND APPARATUSES FOR MULTIPLE ACCESS IN A WIRELESS COMMUNICATION NETWORK USING DCT-OFDM

RELATED APPLICATIONS

This application claims priority under 35 U.S.C. §119 to U.S. provisional patent application Ser. No. 61/313,346, filed Mar. 12, 2010, the entire contents of which application are incorporated by reference herein.

FIELD OF THE INVENTION

The present invention generally relates to wireless communication networks, and particularly relates to methods and apparatuses providing multiple-access in wireless communication networks based on DCT-OFDM (Discrete Cosine Transform Orthogonal Frequency Division Multiplex).

BACKGROUND

OFDM based on Discrete Fourier Transform (DFT) processing is a popular modulation approach in developing and planned wireless communication systems, such as 3GPP LTE, IEEE WiMAX 802.16x, IEEE WiFi 802.11x, etc. DFT-based modulation provides efficient and practical channel equalization algorithms, when used for the transmission of multi-carrier signals, like the OFDM signals used in LTE and LTE-Advanced. Furthermore, multiple access solutions that allow flexible resource allocation (e.g., Orthogonal Frequency Division Multiple Access or OFDMA) can be implemented in conjunction with the use of DFT-based and other OFDM signals structures.

However, the OFDM signal is characterized by large fluctuations of its power envelope that result in occasional spikes in the power of the signal—for example, such signals are characterized by having a relatively high Peak-to-Average-Power-Ratio (PAPR) or high "Cubic Metric" (CM). The large power fluctuations in high PAPR/CM signals impose significant design requirements on the radiofrequency (RF) power amplifier (amplifier chains) used to transmit OFDM signals. In particular, the large power fluctuations require the RF Pas to be operated with significant back-off, to have sufficient margin for accommodating the power peaks in the OFDM signal. More generally, the overall transmit signal chain must be "dimensioned" in one or more senses, to handle the worst-case power peaks of the OFDM signal.

For energy, cost, or space critical designs (e.g., mobile devices) the power back-off margins required by DFT-OFDM lead to an inefficient solution. Therefore, modifications to the standard OFDM system have been introduced, to obtain systems with roughly the same advantages of DFT-OFDM over single carrier systems, but with more compressed signal dynamics. The two most popular techniques are Distributed Single Carrier OFDMA (sometimes also called B-IFDMA) and Localized Single Carrier (LOC-SC) OFDMA, also referred to as DFTS-OFDM. LOC-SC-OFDMA has been adopted for 3GPP LTE, to improve the efficiency of uplink transmissions.

In both LOC/DIST-SC-OFDMA, the Inverse DFT (IDFT) modulator at the transmitter is preceded by a standard DFT precoder. The two techniques differ in the way the outputs from the DFT precoder are mapped to the inputs on the IDFT. Inverse processing is correspondingly performed at the receiver side, and linear equalization techniques can be performed in the same way as for conventional OFDM/OFDMA.

As a further alternative, researchers have investigated new modulation systems based on the use of Discrete Cosine Transform (DCT) processing. See, e.g., P. Tang, N. C. Beaulieu, "A Comparison of DCT-Based OFDM and DFT-Based OFDM in Frequency Offset and Fading Channels," IEEE 2006.

Further work has touched on the use of DCT-based transmission "precoding" in the OFDM context, in the interest of improving system performance through, e.g., lower Bit Error Rates (BERs). See, e.g., de Fein, C. and Fagan, A. D., "Precoded OFDM—An Idea Whose Time Has Come," ISSC 2004, Belfast. Additional work on precoding in the context of DCT-based OFDM appears in, e.g., Wang, Zhengdao and Giannakis, Georgios, "Linearly Precoded or Coded OFDM against Wireless Channel Fades?" Third IEEE Signals Processing Workshop, Taiwan, 2001.

Broadly, with DCT-based OFDM, the transmitter employs a DCT (or, equivalently, an IDCT) for modulation processing. Compared to conventional DFT-based OFDM systems equalization in the DCT-OFDM context is more complex. However, DCT-based OFDM systems retain the attractive channel diagonalization properties of DFT-OFDM, based on employing a symmetric Cyclic Prefix (CP) and a pre-filter at the receiver. See, e.g., N. Al-Dhahir, H. Minn, S. Satish, "Optimum DCT-Based Multicarrier Transceivers for Frequency-Selective Channels," IEEE 2006.

While DCT-based OFDM offers a number of promising characteristics, the underlying signals used in an DCT-OFDM system still experience potentially large envelope fluctuations that are difficult to handle within the practical limits of hardware. Furthermore, there appears to be significant work remaining in developing efficient multiple access techniques that allow the co-scheduling of multiple users, while still offering an advantageously low PAPR/CM.

SUMMARY

The present invention provides an advantageous transmitter apparatus and associated method, for generating a Single-Carrier Discrete Cosine Transform (SC-DCT) OFDM signal for transmission. These transmit-side innovations include circuit configuration and signal processing methods for mapping $K_u$ "input subcarriers" to N "output subcarriers," where the "output subcarriers" are some or all of the subcarriers defined for the SC-DCT OFDM signal. In one or more embodiments, $K_u$ is less than N, and the mapping is based on advantageous DCT/IDCT precoding. The present invention additionally or alternatively includes advantageous frequency-selective mapping, and further provides a corresponding receiver apparatus and associated method, for receiving and de-mapping the SC-DCT OFDM signals contemplated herein.

In one embodiment, the present invention provides a transmitter circuit configured to generate an SC-DCT OFDM signal for transmission. The transmitter circuit includes a signal processing chain configured to map $K_u$ input subcarriers to N output subcarriers, according to the formula $N=2^S K_u$. Here, S indicates the integer number of DCT precoder stages included in series within the signal processing chain, where $S \geq 1$.

The signal processing chain of the transmitter circuit includes: a serial-to-parallel converter configured to generate the $K_u$ input subcarriers according to a series of information symbols to be transmitted; a cyclic prefix or zero padding circuit configured to add a cyclic prefix or zero padding to the N output subcarriers, for input to a parallel-to-serial converter that is configured to form the SC-DCT OFDM signal; and one or more series DCT precoder stages between the serial-to-parallel converter and the cyclic prefix or a zero padding circuit.

Each such DCT precoder stage is configured to generate 2M output subcarriers from M input subcarriers, and to map the M input subcarriers to even-numbered or odd-numbered ones of the 2M output subcarriers, in dependence on an even/odd shift control signal applied to the stage, and each such stage comprising a DCT circuit followed by an IDCT circuit. Further, a first one of the DCT precoder stages takes the $K_u$ subcarriers as its M input subcarriers, and a last one of the DCT precoder stages provides the N output subcarriers as its 2M output subcarriers.

In another embodiment, the present invention provides a method of generating an SC-DCT OFDM signal for transmission. The method includes forming a parallel vector of $K_u$ input subcarriers from a series of information symbols to be transmitted, and mapping the $K_u$ input subcarriers to N output subcarriers by passing the $K_u$ input subcarriers through one or more DCT precoder stages. Here, $N=2^S K_u$, and S (S≥1) indicates the integer number of series DCT precoder stages. Further, the method includes inserting a cyclic prefix or a zero padding into the N output subcarriers and subsequently converting the N output subcarriers into a serial signal, for generating the SC-DCT OFDM signal for transmission.

As for mapping according to the method, the mapping done in each DCT precoder stage comprises passing M input subcarriers through a DCT function followed by an IDCT function, to generate 2M output subcarriers. The M input subcarriers are mapped to even or odd ones of the 2M output subcarriers, in dependence on an even/odd shift control signal. In this regard, $M=K_u$ for a first DCT precoder stage and $2M=N$ for a last DCT precoder stage.

In a further embodiment, the present invention provides a method of generating an SC-DCT OFDM signal for transmission, where the method includes forming a parallel vector of $K_u$ input subcarriers from a series of information symbols to be transmitted, and mapping the $K_u$ input subcarriers to N output subcarriers. That mapping is accomplished by passing the $K_u$ input subcarriers through a mapping circuit and an Inverse (IDCT) circuit of size N, wherein $K_u < N$.

In particular, the $K_u$ subcarriers are mapped on a frequency-selective basis to said N output subcarriers, based on identifying preferred subcarrier frequencies. For example, channel state information from a remote receiver targeted by the SC-DCT OFDM signal can be used to guide the frequency-selective mapping, such as to select those subcarriers having more favorable fading and/or interference characteristics. The method further includes inserting a cyclic prefix or a zero padding into the N output subcarriers and subsequently converting the N output subcarriers into a serial signal, for generating the SC-DCT OFDM signal for transmission.

In yet another embodiment, the present invention provides a receiver circuit configured to process a received SC-DCT OFDM signal. The receiver circuit includes a signal processing chain configured to de-map N input subcarriers from the received SC-DCT OFDM signal to $K_u$ output subcarriers, according to the formula $K_u=N/2^S$, wherein S indicates the integer number of DCT decoder stages included in series within the signal processing chain. (Note that S≥1.) The signal processing chain also includes a pre-processing circuit that is configured to remove a cyclic prefix from the N input subcarriers, in advance of the de-mapping.

As part of its decoding configuration, the signal processing chain includes one or more series DCT decoder stages following the pre-processing circuit. Each such stage is configured to generate M output subcarriers from 2M input subcarriers, by mapping even-numbered or odd-numbered ones of the 2M input subcarriers as said M output carriers, in dependence on an even/odd shift control signal applied to the stage. In accordance with this configuration, each DCT decoder stage comprises a DCT circuit followed by an IDCT circuit. Thus, a first one of the DCT decoder stages takes the N input subcarriers as its 2M input subcarriers, and a last one of the DCT decoder stages provides the $K_u$ output subcarriers as its M output subcarriers.

Still further, in another embodiment the present invention provides a method for use in a receiver circuit configured to process a received SC-DCT OFDM signal. The method includes removing a cyclic prefix from N input subcarriers from the received SC-DCT OFDM signal, and de-mapping the N input subcarriers from the received SC-DCT OFDM signal to $K_u$ output subcarriers, after removing said cyclic prefix, according to the formula $K_u=N/2^S$. Here, S indicates the integer number of DCT decoder stages included in series within a signal processing chain of the receiver circuit, where S≥1.

According to the method, the de-mapping includes, in each of one or more series DCT decoder stages included in the receiver circuit, generating M output subcarriers from 2M input subcarriers, based on mapping even-numbered or odd-numbered ones of the 2M input subcarriers as said M output carriers, in dependence on a even/odd shift control signal applied to the stage, and further comprising generating said M output carriers based on performing a DCT on the 2M input subcarriers, followed by performing an IDCT on the results obtained from said DCT.

Further, while this disclosure uses LTE Advanced as an example context, it should be understood that the present invention has broader applicability. For example, the present invention has applicability to future evolutions of other systems, including WCDMA, CDMA, WiMax, UMB, etc. More generally, the present invention is not limited to the above brief summary of features and advantages. Indeed, those skilled in the art will recognize additional features and advantages upon reading the following detailed description, and upon viewing the accompanying drawings.

BRIEF DESCRIPTION OF THE DRAWINGS

FIGS. 7 and 8 are logic flow diagrams, illustrating one embodiment of complementary transmitter and receiver methods of SC-DCT OFDM signal processing, as taught herein.

DETAILED DESCRIPTION

Figure 1:
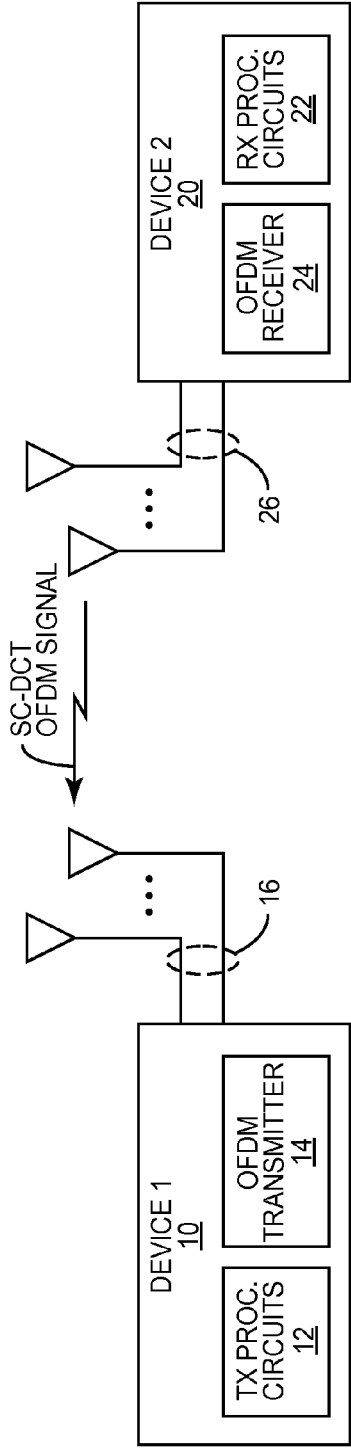
FIG. 1 is a block diagram of one embodiment of a first radio apparatus configured to generate and transmit an SC-DCT OFDM signal as taught herein, and a second radio apparatus configured to receive and process that signal.

FIG. 1 illustrates a first radio apparatus 10 ("Device 1") that includes transmit processing circuits 12 configured to cooperate with an OFDM transmitter 14, for transmission of an SC-DCT OFDM signal from one or more transmit antennas 16. The radio apparatus 10 is configured to generate SC-DCT OFDM signals according to any one or more of the embodiments taught herein. In complementary fashion, FIG. 1 further depicts a second radio apparatus 20 ("Device 2") that includes receiver processing circuits 22 configured to receive and process SC-DCT OFDM signals, as received at the radio apparatus 20 via its OFDM receiver 24 and associated antenna(s) 26.

As part of the signal processing carried out in the system of FIG. 1 (i.e., at or between the two radio apparatuses 10 and 20), an advantageous embodiment of the DCT-related processing is based on the orthogonal DCT matrix, expressed as:

$$C(l, m) = \begin{cases} \sqrt{\dfrac{2}{N}} \cos\left(\dfrac{(l-1)(2m-1)\pi}{2N}\right), & 1 \leq l, m \leq N, l \neq 1 \\ \sqrt{\dfrac{1}{N}}, & l = 1. \end{cases} \quad \text{(Eq. 1)}$$

Figure 2:
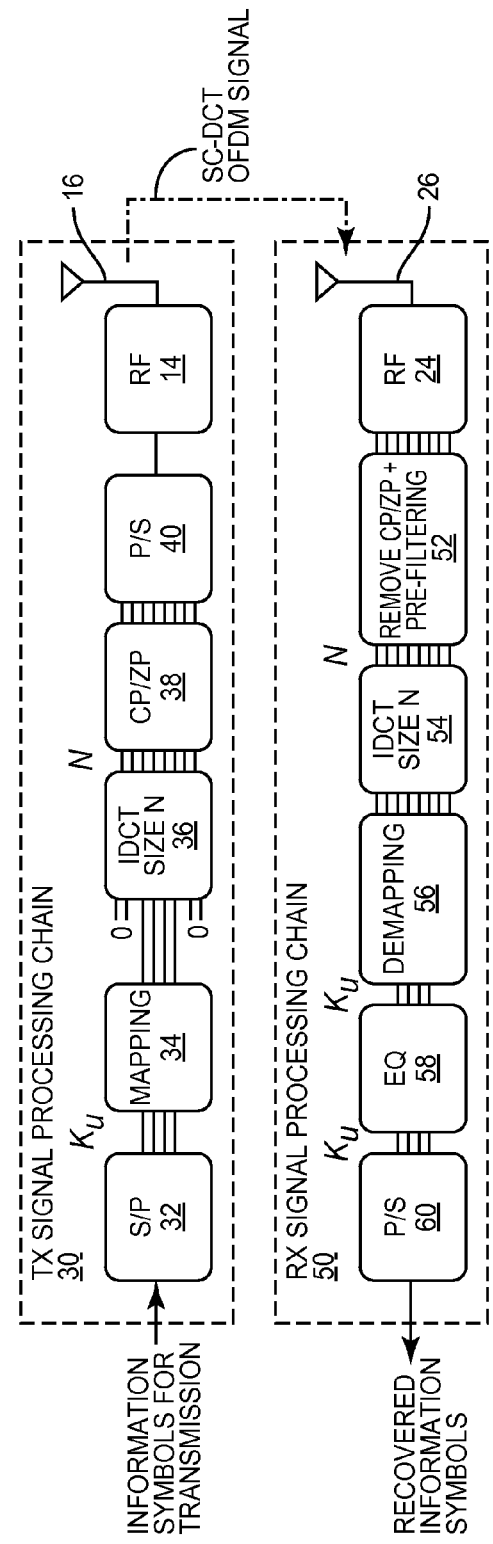
FIGS. 2-4 are block diagrams of example embodiments of transmit and receive signal processing chains, such as can be used in the radio apparatuses of FIG. 1.

With the above DCT structure in mind, FIG. 2 illustrates one embodiment contemplated herein for SC-DCT OFDM signal generation, transmission, and corresponding reception and processing. In at least one embodiment, the transmit-side processing circuitry illustrated in FIG. 2 provides for DCT-OFDMA, where multiple users are supported based on selectively mapping each user to a different subset of the defined or available N subcarriers within the overall SC-DCT OFDM signal.

In FIG. 2, a given serial stream of information symbols (e.g., associated with a given user) is processed by a transmit signal processing chain 30, which is implemented, for example, in the transmit processing circuits 12 of the radio apparatus 10 depicted in FIG. 1. The input signal (serial symbol stream) is parallelized via a serial-to-parallel (S/P) converter 32, making it a length $K_u$ symbol vector—note that successive blocks of $K_u$ symbols from the input information stream are used to generate successive length-$K_u$ symbol vectors, for transmission via the SC-DCT OFDM signal being generated by the transmit signal processing chain 30. That signal includes a total of N defined or otherwise available subcarriers, at spaced apart narrowband carrier frequencies (as is generally understood for OFDM), and the length-$K_u$ symbol vector is mapped to $K_u$ of the N subcarriers, where, for one or more embodiments herein, $K_u$ is less than N.

Note that the other subcarriers are, in at least one embodiment, assigned zero ("0") or no-signal values. Thus, where the radio apparatus 10 is one of multiple user terminals or other devices transmitting on the uplink (UL) to the radio apparatus 20 serving as a network base station, it will be understood that different such devices may use different $K_u$ subsets of the N available subcarriers. Thus, the set of selected $K_u$ subcarriers used by a given user is, according to one or more embodiments taught herein, assigned by a scheduling function. For example, by properly choosing the scheduled subcarriers it is possible to focus the signal energy on the most convenient or favorable portions of the wireless channel, i.e., typically the subcarrier where the channel has large energy.

The illustrated transmit signal processing chain 30 includes, beyond the S/P converter 32, a mapping circuit 34 that maps the $K_u$ subcarriers to particular ones of the N subcarriers of the OFDM signal—in this context, the $K_u$ subcarriers are referred to as "input" subcarriers, as they are the ones being mapped, and the N subcarriers are referred to as the "output" subcarriers, as they are the actual subcarriers available for use in the transmitted OFDM signal.

In any case, the mapping circuit 34 is followed by an IDCT circuit 36 (of size N), which applies an Inverse Discrete Cosine Transform to the $K_u$ subcarriers. The size N output from the IDCT circuit 36 includes the mapped $K_u$ subcarriers with the remaining (N–$K_u$) subcarriers set, e.g., to zero. A CP/ZP circuit 38 inserts a cyclic prefix (CP) or a zero padding (ZP). Note that at least one embodiment of the CP/ZP circuit 38 adds a CP and, optionally, a cyclic suffix (CS). Also, note that certain design issues may be considered in terms of deciding whether to use CP insertion or ZP insertion. For example, CP insertion effectively diagonalizes the propagation channel and thereby simplifies equalization processing at the receiver, although prefiltering generally is required. In contrast, equalization is more complex when ZP is used, but prefiltering generally is not needed.

After CP or ZP insertion, a parallel-to-serial (P/S) converter 40 converts the signal to a serial stream. The serial stream is input to the OFDM transmitter circuit 14, for D/A conversion, modulation to the carrier/subcarrier frequencies, amplification, etc., and transmission as the SC-DCT OFDM signal.

Thus, one method taught herein is the generation of an SC-DCT OFDM signal for transmission, based on: forming a parallel vector of $K_u$ input subcarriers from a series of information symbols to be transmitted; and mapping the $K_u$ input subcarriers to N output subcarriers through a mapping circuit 34 and an Inverse DCT (IDCT) circuit 36 of size N, wherein $N > K_u$. In particular, wherein the mapping is performed on a frequency-selective basis, based on identifying preferred subcarrier frequencies. That is, the IDCT circuit 36 maps the $K_u$ parallel information symbols to the inputs of the IDCT circuit 36, which produces N output subcarriers.

On the receive-side, one sees an example receive signal processing chain 50, which, for example, is implemented within the receiver processing circuits 22 that are depicted for the second radio apparatus 20 in FIG. 1. The SC-DCT OFDM signal propagates from the transmit antenna(s) 16 of the first radio apparatus 10 and is received on the antenna(s) 26 of the second radio apparatus 20, where it is initially processed in the OFDM receiver 24 (e.g., filtered, downconverted/digitized).

The receive signal processing chain further includes a CP/ZP removal circuit 52, which also may be configured as a prefilter; a size NDCT circuit 54; a demapping circuit 56, to de-map the $K_u$ subcarriers of interest from the N subcarriers; an equalization (EQ) circuit 58 to operate on the $K_u$ subcarriers; and a parallel-to-serial (P/S) converter 60, to output a serialized version of the equalized signal from the EQ circuit 58. It will be understood that a base station or other node intended for receiving and processing signals from multiple remote transmitters will include (at least functionally) multiple receive signal processing chains 50, for processing the signals from different transmitters. Alternatively, the receive signal processing chain 50 can be sized or otherwise structured to process multiple sets of $K_u$ subcarriers from the received SC-DCT OFDM signal.

Figure 3:
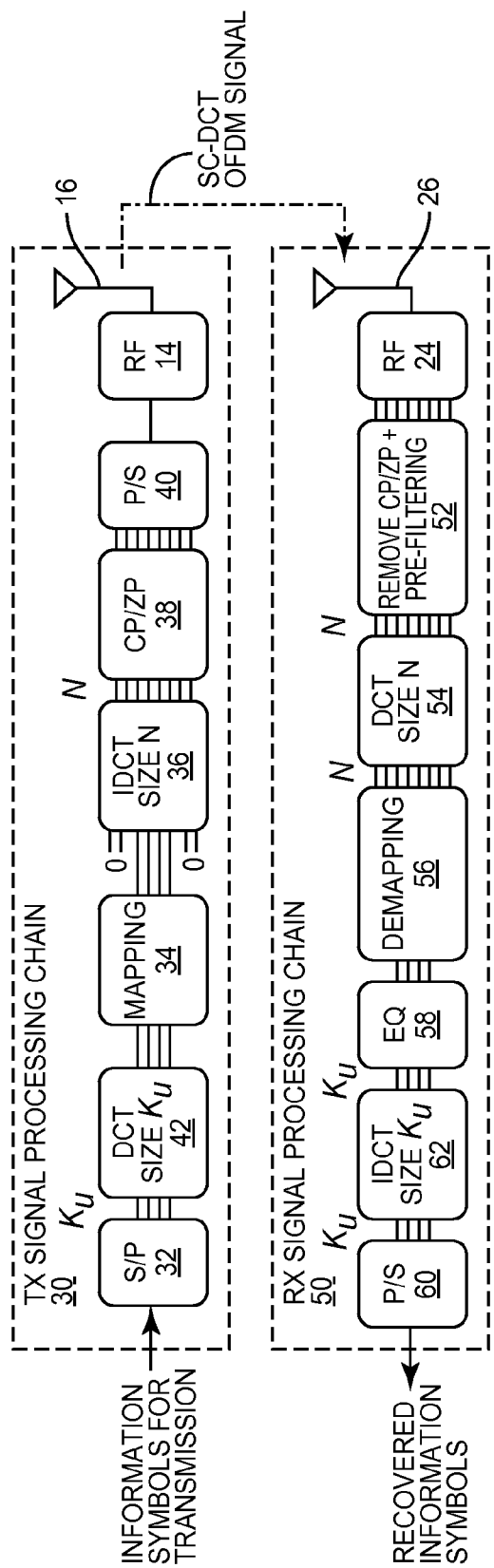

FIG. 3 depicts another embodiment, which presents a solution referred to as "LOC-SC-DCT-OFDM" (Localized Single Carrier DCT based OFDM). In this case, the user signal of length $K_u$ symbols is first precoded through a DCT precoder circuit 42 of length $K_u$, and then mapped to the IDCT modulator circuit 36. The mapped precoded information symbols output by the DCT precoder 42 are, for example, mapped to adjacent subcarriers, in typical SC fashion.

In at least one embodiment, a method of generating a LOC-SC-DCT OFDM signal for transmission comprises converting a number $K_u$ of information symbols into a parallel vector of $K_u$ information symbols, and precoding the parallel $K_u$ information symbols in a Discrete Cosine Transform (DCT) precoder, to create $K_u$ precoded information symbols. The method further includes mapping the $K_u$ precoded information symbols to $K_u$ selected inputs of an Inverse DCT (IDCT) modulator and correspondingly generating $K_u$ mapped subcarriers from among N output subcarriers from the IDCT modulator. Still further, the method includes inserting a cyclic prefix (CP) or a zero padding (ZP) into the N subcarriers, and converting the N subcarriers into a serial stream for transmission as the LOC-SC-DCT signal. Note that in at least one such embodiment, generating the $K_u$ mapped subcarriers from among N output subcarriers from the IDCT modulator comprises generating $K_u$ consecutively-mapped subcarriers from among N output subcarriers from the IDCT modulator.

Such transmit-side precoding results in the receive signal processing chain 50 including an extra component, as compared to the embodiment of FIG. 2. Namely, an IDCT circuit 62 of size $K_u$, positioned after the equalizer 58. As compared to the embodiment of FIG. 2, the embodiment of FIG. 3 provides a basis for a multiple access (MA) scheme that allows more limited scheduling flexibility, given that adjacent mapping of the $K_u$ subcarriers is required for best CM performance. That is, where the frequency-selective mapping used in the transmit processing chain 30 of FIG. 2 may use non-contiguous mapping of the $K_u$ subcarriers to the N available subcarriers, the embodiment of FIG. 3 can be constrained to use consecutive mapping to maximize CM performance.

Figure 4:
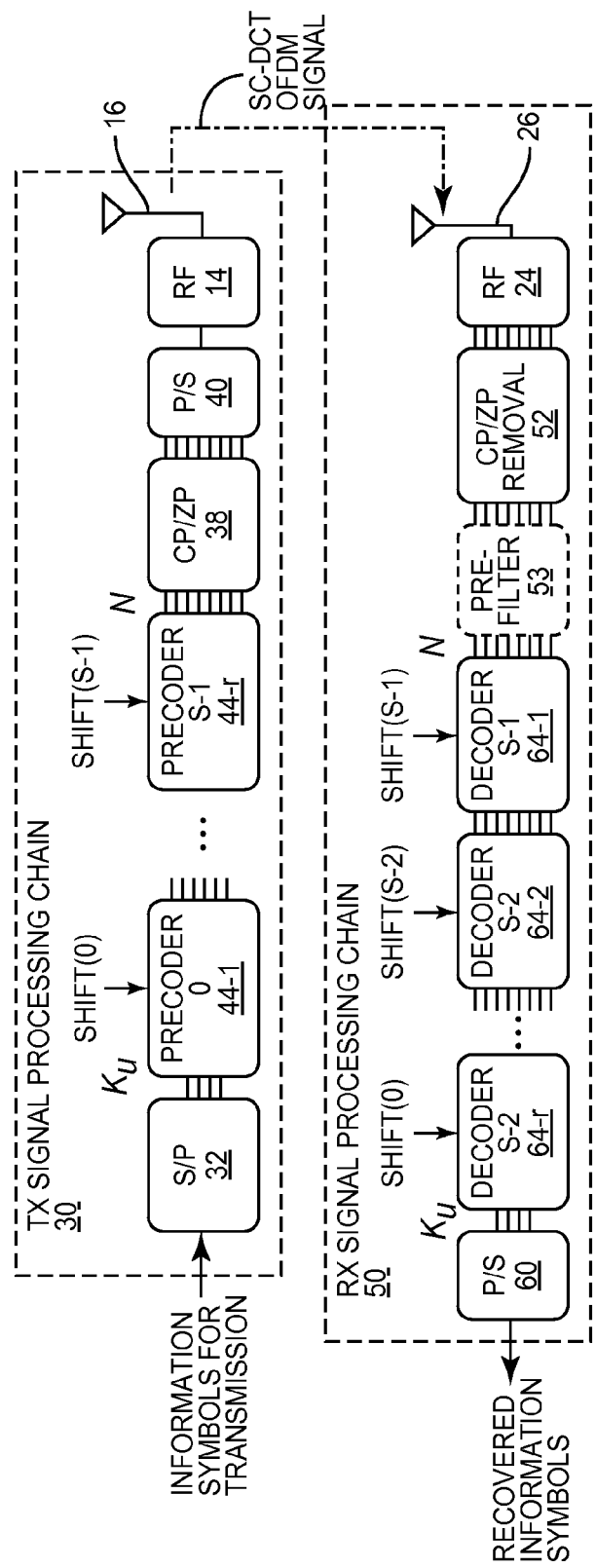

FIG. 4 illustrates yet another embodiment of the present invention. Here, the transmit signal processing chain 30 is modified to include one or more DCT precoder stages 44 (e.g., 44-1 through 44-r) that are serially chained to implement a form of the DCT precoding and mapping previously described. Correspondingly, the illustrated receive signal processing chain 50 includes an embodiment of the previously introduced OFDM receiver 24, for receiving the OFDM signal(s) transmitted by the transmit signal processing chain 30.

The illustrated receive signal processing chain 50 further includes a CP/ZP removal circuit 52. If the CP/ZP insertion circuit 38 of the transmit signal processing chain 30 is configured to insert a CP, then the CP/ZP removal circuit 52 is configured to remove the CP from the received signal. Conversely, if the CP/ZP insertion circuit 38 is configured to use zero padding—i.e., to insert a ZP rather than a CP—then the CP/ZP removal circuit 52 is configured to remove the ZP from the received signal.

As earlier noted, one advantage of CP insertion on the transmit side is the advantage of simpler equalization on the receive side. That advantage is partially offset by the need for pre-filtering of the received signal when CP insertion is used. Thus, the receive signal processing chain 50 illustrates a pre-filter circuit 53, which is used/implemented in the case that CP insertion is used on the transmit side. In such configurations, the pre-filter circuit 53 is configured to provide the necessary received signal pre-filtering. If ZP insertion is used on the transmit side, pre-filtering need not be implemented.

Figure 6A:
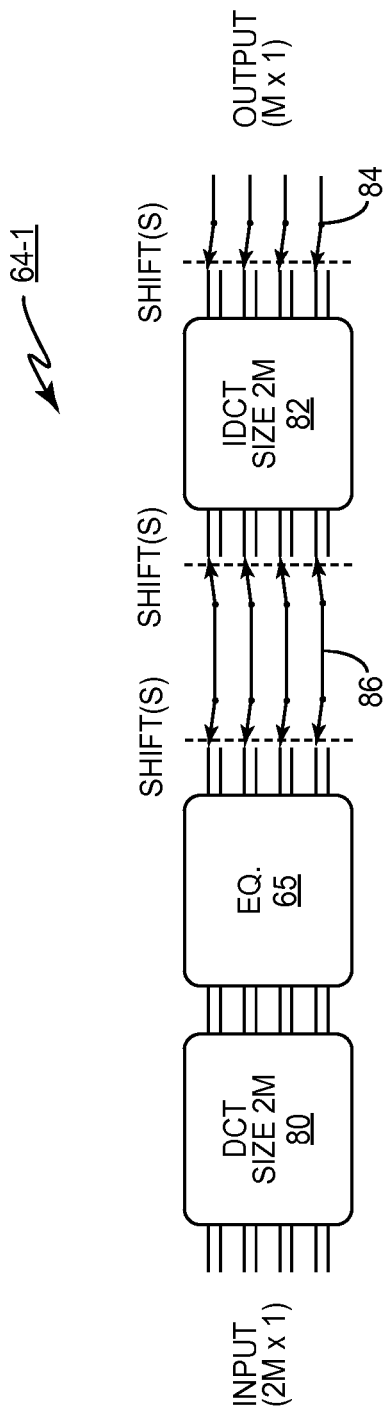

Following the CP/ZP removal and (possible) pre-filtering, one sees a series of DCT decoder stages 64. In general, the receive signal processing chain 50 includes the same number of DCT decoder stages 64 as DCT precoder stages 44 used in the transmit signal processing chain 30. Here, one sees DCT decoder stages 64-1 through 64-r, corresponding to DCT precoder stages 44-1 through 44-r on the transmit side. Also, note that the first DCT decoder stage 64-1 generally includes an EQ circuit 65, such as depicted in FIG. 6A.

The use of CP insertion on the transmit side provides channel diagonalization and attendant simplification of the equalization processing implemented in the eq. circuit 65, while the use of ZP generally requires more complex equalization process, while advantageously eliminating the need for pre-filtering. In any case, those of ordinary skill in the art will appreciate that the eq. circuit 65 may be configured to implement an equalization matrix and processing circuit that forms linear combinations of the input (received signal), where the resultant combined (signals) exhibit reduced inter-carrier interference.

In the embodiment of FIG. 4, which may be referred to as DIST-SC-DCT-OFDM (Distributed Single Carrier DCT OFDM), the number of scheduled subcarriers is related to the number of defined or available subcarriers as $N=2^S K_u$, where S is an integer that indicates the number of DCT precoding stages 44, as explained below.

Each DCT precoding stage 44 on the transmit side doubles the number of generated subcarriers and maps the signal only on even or odd subcarriers according to a SHIFT(s)={0;1} flag, where s is the precoder index. Therefore, only the subcarriers indexed as offset+k*$2^S$ (with k=0 ... $K_u$; offset= {0 ... $-2^S-1$}) carry the transmitted signal, while the other subcarriers do not carry energy. The value of the variable offset is determined by the values of SHIFT(s). Corresponding decoding steps are performed at the receiver side, where, as noted, the first DCT decoder stage 64-1 includes or is associated with equalization processing, as provided by the eq. circuit 65.

Figure 5:
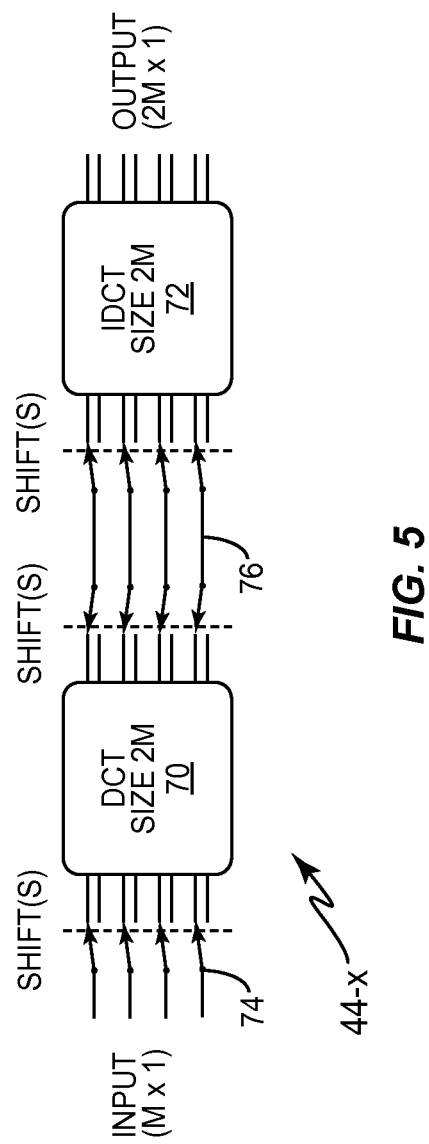
FIGS. 5 and 6A/B are block diagrams of one embodiment of the DCT precoder and decoder stages, respectively, as are used in the signal processing chains depicted in FIG. 4.
Figure 6B:
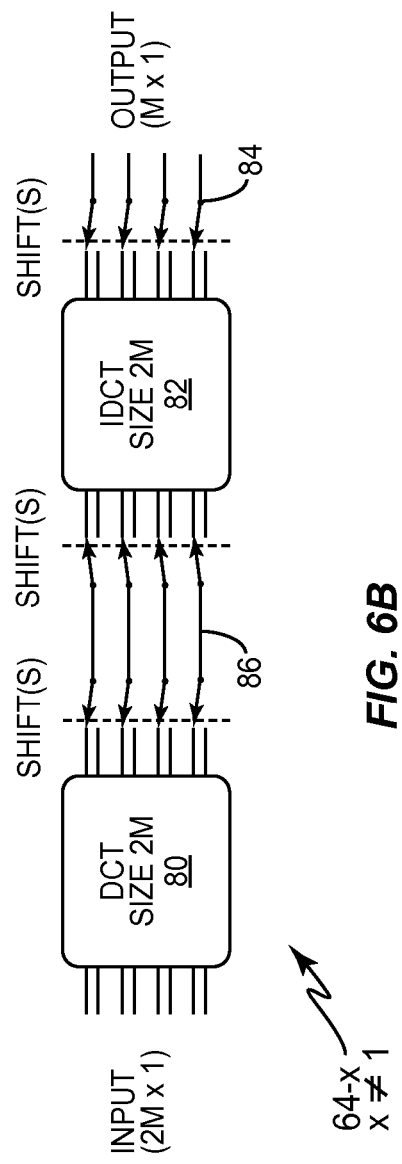

Each DCT precoder stage 44 (and corresponding DCT decoder stage 64) is obtained from a combination of down-sampled DCT/IDCT processing and subcarrier mapping, as shown in FIG. 5. Particularly, FIG. 5 depicts a DCT precoder stage 44 as comprising an input DCT circuit 70 that receives an M×1 input vector. The output from the DCT circuit 70 serves as the input to a size 2M IDCT circuit 72, which provides 2M output subcarriers. The complementary, opposite arrangement is shown in FIGS. 6A and 6B, for the receive-side processing, wherein a DCT circuit 80 receives 2M input subcarriers, with its output fed to a size 2M IDCT circuit 82 that outputs M output subcarriers. (Note that DCT decoder stage 64-1 receives a time-domain input signal, and outputs subcarriers.)

Further, the switches 74/76 in FIG. 5 and 84/86 in FIGS. 6A and 6B correspond to the even-odd shifting control done responsive to the SHIFT(s) signals applied to each stage. For clarity, FIG. 6A depicts the first DCT decoder stage 64-1 within the receive signal processing chain, with the eq. circuit 65 integrated within its signal processing stages. FIG. 6B correspondingly illustrates any one of the succeeding DCT decoder stages 64-2, ..., 64-r.

The embodiment of FIGS. 4-6A/B may offer less scheduling flexibility, as compared to the embodiments of FIGS. 2 and 3, for example, because the scheduled $K_u$ subcarriers are distributed over the whole bandwidth of the N subcarriers, albeit according to the even or odd mapping. On the other hand, this embodiment offers excellent CM performance. (It can be analytically shown that the output signal in this embodiment preserves the CM of the input signal.)

Further, with the embodiment of FIG. 4 in mind, FIGS. 7 and 8 illustrate example, complementary transmit-side and receive-side methods that are respectively implemented by the radio apparatuses 10 and 12 of FIG. 1, and particularly according to the signal processing chains 30 and 50 shown in FIG. 4.

FIG. 7 broadly depicts a method 700 for generating the types of SC-DCT OFDM transmit signals contemplated in the embodiment depicted in FIG. 4. It will be understood that the transmit processing circuits 12 and OFDM transmitter 14 of the radio apparatus 10 are configured (e.g., via software, hardware, or both) to carry out the illustrated method, which includes forming a parallel vector of $K_u$ input subcarriers (Block 702). These $K_u$ "subcarriers" represent the parallelized symbol streams formed by converting, e.g., blocks of a serial transmit information stream into corresponding parallel symbol vectors.

The method 700 continues with mapping the $K_u$ input subcarriers to N output subcarriers, wherein the mapping is performed in one or more DCT precoder stages (Block 704). Here, the "output" subcarriers represent the actual subcarriers available for use in the SC-DCT OFDM transmit signal to be generated. Thus, the process takes an ongoing serial transmit information stream and converts it into a succession of symbol vectors, each having $K_u$ information symbols, and where each such symbol vector is referred to as $K_u$ "input subcarriers." In turn, those $K_u$ input subcarriers are mapped to N particular ones of the actual subcarriers comprising the OFDM signal structure.

In particular, the mapping is done using advantageously constructed and configured DCT precoders, as will be detailed later herein. The method continues with inserting a CP or ZP and converting the N output subcarriers to serial form, which is then amplified, etc., and transmitted as the SC-DCT OFDM signal (Block 706).

FIG. 8 illustrates a corresponding receiver method 800, which is implemented within the radio apparatus 20 of FIG. 1, in one or more embodiments taught herein. According to the method, the receiver processing circuits 22 of the radio apparatus 20 are configured to process a received SC-DCT OFDM signal, based on removing a CP or ZP from N input subcarriers from the received SC-DCT OFDM signal (Block 802).

The method continues with de-mapping the N input subcarriers from the received SC-DCT OFDM signal to $K_u$ output subcarriers, after removing said CP or ZP (Block 804). The de-mapping is done according to the formula $K_u=N/2^S$, where S indicates the integer number of DCT decoder stages included in series within a signal processing chain of the receiver circuit 22 (S≥1). The contemplated de-mapping includes, in each of one or more series DCT decoder stages included in the receiver circuits 22, generating M output subcarriers from 2M input subcarriers.

In particular, such processing is based on mapping even-numbered or odd-numbered ones of the 2M input subcarriers as said M output carriers, in dependence on a even/odd shift control signal applied to the stage, and further comprising generating said M output carriers based on performing a DCT on the 2M input subcarriers, followed by performing an IDCT on the results obtained from said DCT. In any case, the method continues with further received signal processing (Block 806), such as decoding or otherwise extracting the originally-transmitted information symbols, for data or control processing at the radio apparatus 20.

Accordingly, in one embodiment, the present invention comprises a transmitter circuit (e.g., transmitter processing circuits 12) configured to generate an SC-DCT OFDM signal for transmission. The transmitter circuit includes a signal processing chain 30 configured to map $K_u$ input subcarriers to N output subcarriers, according to the formula $N=2^S K_u$. The term S indicates the integer number of DCT precoder stages 44 included in series within the signal processing chain 30, wherein S≥1.

The signal processing chain 30 includes a serial-to-parallel converter 32 configured to receive a series of $K_u$ information symbols and to correspondingly generate a parallel set of $K_u$ output information symbols—e.g., a vector of $K_u$ output information symbols, for transmission. A CP/ZP circuit 38 is configured to add a CP or ZP to the N output subcarriers, for input to a parallel-to-serial (P/S) converter 40 that is configured to form the SC-DCT OFDM signal. Further, as noted, the signal processing chain 30 further includes one or more series DCT precoder stages 44 between the serial-to-parallel converter 32 and the CP/ZP circuit 38.

Each such stage 44 is configured to generate 2M output subcarriers from M input subcarriers, and to map the M input subcarriers to even-numbered or odd-numbered ones of the 2M output subcarriers, in dependence on an even/odd shift control signal applied to the stage 44. (The transmit processing circuits 12 will be understood to include, for example, a shift control circuit configured to generate the shift control signals.) Further, as shown in FIG. 5, each such DCT precoder stage 44 comprises a DCT circuit 70 followed by an IDCT circuit 72. With this arrangement, a first one of the DCT precoder stages 44-1 takes the $K_u$ subcarriers as its M input subcarriers, and a last one of the DCT precoder stages 44-$r$ provides the N output subcarriers as its 2M output subcarriers.

In at least one embodiment, there is a plurality of said signal processing chains 30, each associated with different series of information symbols to be transmitted, and a shift control circuit that is configured to generate even/odd shift control signals for each said signal processing chain 30, such that different patterns of even or odd subcarrier mapping are used between the different signal processing chains 30. In at least one such embodiment, the shift control circuit is configured to generate the different patterns of even or odd subcarrier mapping in consideration of the number of DCT precoder stages 44 included in each signal processing chain 30.

Further, in at least one such embodiment, the shift control circuit is included in a multiple-access scheduling circuit—which, again, is implemented functionally within the transmit processing circuits 12, in one or more example embodiments—that is configured to determine the number of subcarriers allocated to different users, and to control the shifting behaviors of each corresponding signal processing chain 30, to differentiate between the different users.

Accordingly, a method is taught herein comprising mapping a plurality of different sets of $K_u$ input subcarriers according to different even/odd shift control signals having different patterns of even/odd shifting, to differentiate the different sets of $K_u$ input subcarriers. In particular, in one embodiment, the method includes generating the different even/odd shift control signals as part of a multiple-access scheduling method that uses the different patterns of even/odd shifting to differentiate between individual receivers—e.g., multiple radio apparatuses 12—being targeted by SC-DCT OFDM signal transmissions.

Still further, in at least one embodiment, at least one DCT precoder stage 44 in the signal processing chain 30 comprises a direct-mapping DCT precoder stage 44 that is configured to form the 2M output subcarriers by taking the M input subcarriers as a length-M ordered sequence and outputting a length-2M output vector that includes the original ordered sequence interspersed with a time-reversed and mirrored version of the original ordered sequence. Such direct-mapping is based on, for example, the direct-mapping DCT precoder stage 44 being configured to negate or not negate the time-reversed mirrored version of the original ordered sequence included in the length-2M output vector, in dependence on the even/odd shift control signal applied to the direct-mapping DCT precoder stage 44.

Likewise, referring again to FIG. 4, the present invention provides a receiver circuit configured to process a received SC-DCT OFDM signal. Such a receiver circuit is functionally implemented within the receiver processing circuits 22, for example, and includes a signal processing chain 50 that is configured to de-map N input subcarriers from the received SC-DCT OFDM signal to $K_u$ output subcarriers, according to the formula $K_u=N/2^S$. Here, the S term indicates the integer number of DCT decoder stages 64 included in series within the signal processing chain 50, wherein $S \geq 1$, and wherein the signal processing chain 50 includes a pre-processing circuit 52 that is configured to remove a CP or ZP from N input subcarriers in advance of de-mapping.

Further, the signal processing chain 50 further includes the previously mentioned one or more series DCT decoder stages 64 following the pre-processing circuit 52. Each such stage 64 is configured to generate M output subcarriers from 2M input subcarriers, by mapping even-numbered or odd-numbered ones of the 2M input subcarriers as said M output carriers. Such mapping is performed in dependence on a even/odd shift control signal applied to the stage 64, and each such stage 64 comprises a DCT circuit 80 followed by an IDCT circuit 82 (such as is shown in the example of FIG. 6). With this arrangement, a first one of the DCT decoder stages 64-1 takes the N input subcarriers as its 2M input subcarriers, and a last one of the DCT decoder stages 64-r provides the $K_u$ output subcarriers as its M output subcarriers.

In at least one such embodiment, at least one of the DCT decoder stages 64 in the signal processing chain comprises a direct-mapping DCT decoder stage that is configured to form the M output subcarriers by selecting a length-M ordered sequence from the 2M input subcarriers, which are known to be formed as a length-2M ordered sequence the length-M ordered sequence interspersed with a time-reversed and mirrored version of the length-M ordered sequence.

Also, regardless of whether direct mapping is or is not used, at least one embodiment of the receiver circuit includes a parallel-to-serial converter circuit 60 that is configured to convert the $K_u$ output subcarriers into a corresponding serial stream, and a processing circuit (e.g., within the receive processing circuits 22) that is configured to obtain or otherwise process the information symbols of interest from the serial stream. Such symbols represent data and/or control signaling.

Figure 9:
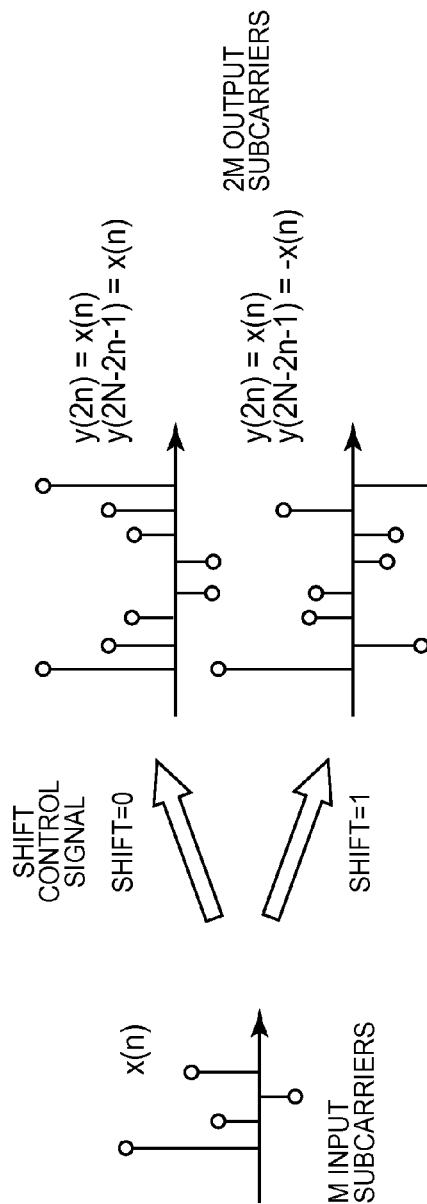
FIGS. 9 and 10 are diagrams of one embodiment of direct implementation of DCT/IDCT processing, to avoid DCT/IDCT computations.
Figure 10:
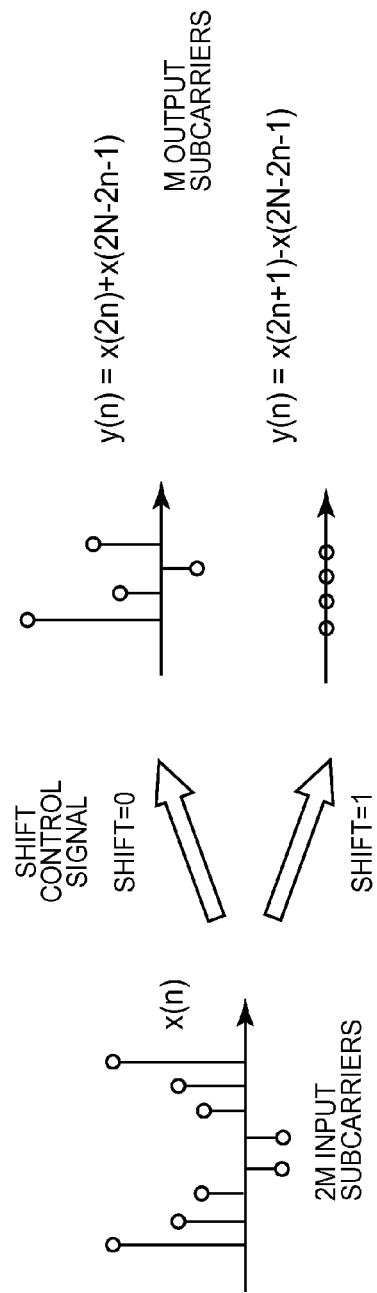

As for example details of the above direct mapping, the present invention advantageously recognizes that certain properties of the DIST-SC-DCT-OFDM scheme can be exploited in the implementation of the DCT precoder and decoder stages 44 and 64, respectively. In particular, it is contemplated herein that the DCT precoder and decoder stages 44 and 64 may be implemented in such a way as to avoid explicit calculations of the DCT/IDCT. Notably, the thus-avoided DCT/IDCT computations may well be the most computationally intensive operations at the transmitter or receiver. The alternative ("direct") implementations of the DCT precoder and decoder stages 44 and 64 are shown in FIGS. 9 and 10, respectively. Note that the direct-determined output sequence of FIG. 9 is or is not based on the negated, time-reversed mirrored versions of the original ordered input sequence, based on the state of the even/odd shift control signal applied to the direct-mapping DCT precoder stage 44.

With the above examples in mind, those skilled in the art will appreciate that the present invention provides a number of advantages. Those advantages include these non-limiting examples: (1) an effective multiple access method that trades scheduling flexibility for signal dynamics compression and where, even in case of full bandwidth allocation, the embodiments of FIGS. 2, 3, and 4 provide reduced CM/PAPR compared to conventional DCT-OFDM; and (2) the embodiments of FIGS. 9 and 10 provide significant computational simplifications.

Figure 11:
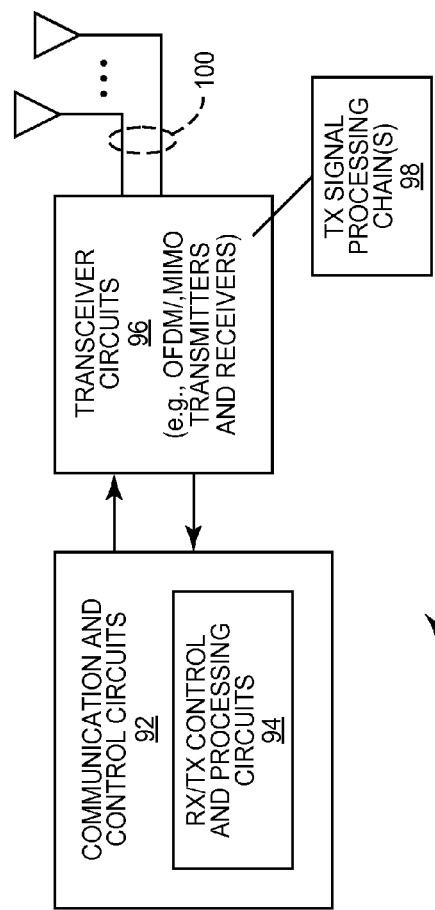
FIGS. 11 and 12 are block diagrams of one embodiment of complementary radio devices, configured to transmit an SC-DCT OFDM signal (as in FIG. 11) and to receive an SC-DCT OFDM signal (as in FIG. 12).

With these example advantages in mind, FIG. 11 illustrates an example radio device 90, which may be configured, for example, as a transmitting node in a wireless communication network. In one example, the device 90 comprises a mobile terminal configured for operation in an LTE, LTE-Advanced, or other type of wireless communication network. The device 90 may be configured, for example, consistent with the radio apparatus 10 introduced in FIG. 1 and discussed at length herein. To that end, the device 90 includes communication and control circuits 92 (e.g., fixed or programmable digital processing circuitry), including receive/transmit control and processing circuits 94, which are associated with transceiver circuits 96 that include one or more transmit signal processing chains 98. These chains 98 are, for example, implemented like the transmit signal processing chain 30 depicted in FIG. 4, for example. As such, the device 90 transmits an SC-DCT OFDM signal from its antenna(s) 100, consistent with the teachings herein.

Figure 12:
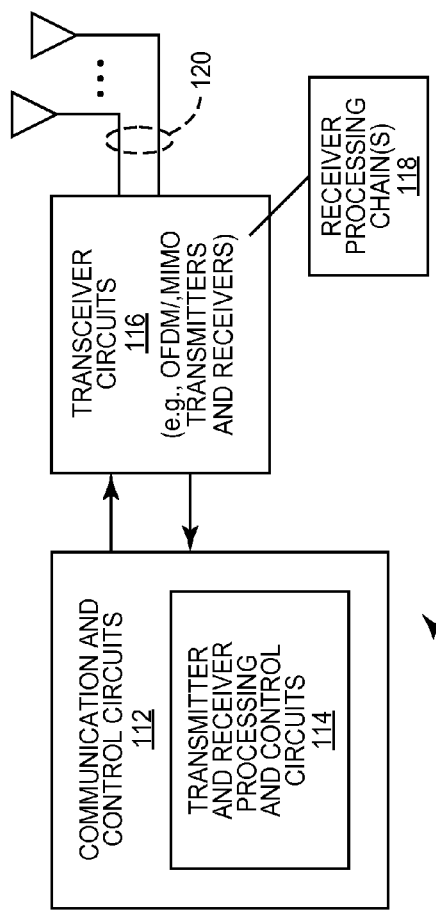

Correspondingly, FIG. 12 illustrates an example radio device 110, which may be configured, for example, as a transmitting node in a wireless communication network. In one example, the device 110 comprises a base station (e.g., eNodeB or eNB) configured for operation in an LTE, LTE-Advanced, or other type of wireless communication network. The device 110 may be configured, for example, consistent with the radio apparatus 20 introduced in FIG. 1 and discussed at length herein. More particularly, in one or more embodiments in this context, the device 110 is configured to receive and process SC-DCT OFDM signals from a plurality of devices 90.

To that end, the device 110 includes communication and control circuits 112 (e.g., fixed or programmable digital processing circuitry), including transmitter/receiver processing and control circuits 114, which are associated with transceiver circuits 116 that include one or more receiver signal processing chains 118. These chains 118 are, for example, implemented like the receive signal processing chain 50 depicted in FIG. 4, for example. As such, the device 110 receives SC-DCT OFDM signals on its antenna(s) 120, consistent with the teachings herein.

Note, too, that in keeping with the MA techniques described herein, the device 110 may control or otherwise configure multiple devices 90 to use different even/odd shift patterns in the DCT precoder stages 44 included in their transmit signal processing chains 98. The assignment of different shifting patterns to different devices 90 reduces interference between the SC-DCT OFDM signals transmitted on the shared uplink by those devices 90.

Of course, the example illustrations of FIGS. 11 and 12, and the other illustrations are not limiting. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure.

Although specific terms may be employed herein, they are used in a generic and descriptive sense only and not for purposes of limitation.

What is claimed is:

1. A transmitter circuit configured to generate a Single-Carrier Discrete Cosine Transform (SC-DCT) OFDM signal for transmission, said transmitter circuit comprising:
a plurality of signal processing chains, wherein each signal processing chain configured to map $K_u$ input subcarriers to N output subcarriers, according to the formula $N=2^S K_u$, wherein S indicates the integer number of DCT precoder stages included in series within the signal processing chain, wherein $S \geq 1$, and wherein said signal processing chain includes a serial-to-parallel converter configured to generate the $K_u$ input subcarriers according to a series of information symbols to be transmitted, a prefix or padding circuit configured to add a cyclic prefix or a zero padding to the N output subcarriers, for input to a parallel-to-serial converter that is configured to form the SC-DCT OFDM signal;
wherein said signal processing chain further includes one or more DCT precoder stages between the serial-to-parallel converter and the prefix or padding circuit, each such stage i, where i=1, 2, ..., S, configured to generate $2M_i$ output subcarriers from $M_i$ input subcarriers, and to map the $M_i$ input subcarriers to even-numbered or odd-numbered ones of the $2M_i$ output subcarriers, in dependence on an even/odd shift control signal applied to the stage, and each such stage comprising a DCT circuit followed by an IDCT circuit;
wherein a first one of the DCT precoder stages takes the $K_u$ subcarriers as its $M_1$ input subcarriers, and a last one of the DCT precoder stages provides the N output subcarriers as its $2M_S$ output subcarriers; and
wherein each of the plurality of said signal processing chains is associated with different series of information symbols to be transmitted and a shift control circuit that is configured to generate even/odd shift control signals for each said signal processing chain, such that orthogonal patterns of even or odd subcarrier mapping are used between the different signal processing chains.

2. The transmitter circuit of claim 1, wherein the shift control circuit is configured to generate the different patterns of even or odd subcarrier mapping in consideration of the number of DCT precoder stages included in each signal processing chain.

3. The transmitter circuit of claim 1, wherein the shift control circuit is included in a multiple-access scheduling circuit that is configured to determine the number of subcarriers allocated to different users, and to control the shifting behaviors of each corresponding signal processing chain, to differentiate between the different users.

4. The transmitter circuit of claim 1, wherein at least one DCT precoder stage in the signal processing chain comprises a direct-mapping DCT precoder stage that is configured to form 2M output subcarriers by taking M input subcarriers as a length-M ordered sequence and outputting a length-2M output vector that includes the original ordered sequence interspersed with a time-reversed and mirrored version of the original ordered sequence.

5. The transmitter circuit of claim 4, wherein the direct-mapping DCT precoder stage is configured to negate or not negate the time-reversed mirrored version of the original ordered sequence included in the length-2M output vector, in dependence on the even/odd shift control signal applied to the direct-mapping DCT precoder stage.

6. The transmitter circuit of claim 1, wherein S>1.

7. A method of generating a Single-Carrier Discrete Cosine Transform (SC-DCT) OFDM signal for transmission, said method comprising:
forming a parallel vector of $K_u$ input subcarriers from a series of information symbols to be transmitted;
mapping the $K_u$ input subcarriers to N output subcarriers by passing the $K_u$ input subcarriers through one or more DCT precoder stages, wherein $N=2^S K_u$, and S ($S \geq 1$) indicates the integer number of DCT precoder stages;
wherein mapping in each DCT precoder stage i, where i=1, 2, ..., S, comprises passing $M_i$ input subcarriers through a DCT function followed by an IDCT function, to generate $2M_i$ output subcarriers, wherein the $M_i$ input subcarriers are mapped to even or odd ones of the $2M_i$ output subcarriers, in dependence on an even/odd shift control signal, and further wherein $M_1=K_u$, for a first DCT precoder stage and $2M_s=N$ for a last DCT precoder stage;
inserting a cyclic prefix or a zero padding into the N output subcarriers and subsequently converting the N output subcarriers into a serial signal, for generating the SC-DCT OFDM signal for transmission; and
forming a plurality of different sets of $K_u$ input subcarriers and mapping the plurality of different sets of $K_u$ input subcarriers according to different even/odd shift control signals having different patterns of even/odd shifting, to differentiate the different sets of $K_u$ input subcarriers.

8. The method of claim 7, further comprising generating the different even/odd shift control signals in consideration of the number of DCT precoder stages used for mapping each set of $K_u$ input subcarriers.

9. The method of claim 7, further comprising generating the different even/odd shift control signals as part of a multiple-access scheduling method that uses the different patterns of even/odd shifting to differentiate between individual receivers being targeted by SC-DCT OFDM signal transmissions.

10. The method of claim 7, further comprising using direct mapping in at least one DCT precoder stage, wherein said direct mapping forms 2M output subcarriers for the given stage by taking M input subcarriers as a length-M ordered sequence and outputting a length-2M output vector that includes the original ordered sequence interspersed with a time-reversed and mirrored version of the original ordered sequence.

11. The method of claim 10, further comprising negating or not negating the time-reversed mirrored version of the original ordered sequence included in the length-2M output vector, in dependence on the even/odd shift control signal applied to the stage.

12. A receiver circuit configured to process a received Single-Carrier Discrete Cosine Transform (SC-DCT) OFDM signal, said receiver circuit comprising:
a signal processing chain configured to de-map N input subcarriers from the received SC-DCT OFDM signal to $K_u$ output subcarriers, according to the formula $K_u=N/2^S$, wherein S indicates the integer number of DCT decoder stages included within the signal processing chain, wherein S>1, and wherein said signal processing chain includes a pre-processing circuit configured to remove a cyclic prefix or zero padding from N input subcarriers in advance of de-mapping;
wherein said signal processing chain further includes two or more series DCT decoder stages following the pre-processing circuit, each such stage i, where i=S, S−1, ..., 1, configured to generate $M_i$ output subcarriers from $2M_i$ input subcarriers, by mapping even-numbered or odd-numbered ones of the $2M_i$ input subcarriers as said $M_i$ output carriers, in dependence on an even/odd shift control signal applied to the stage, and each such stage comprising a DCT circuit followed by an IDCT circuit; and wherein a first one of the DCT decoder stages takes the N input subcarriers as its $2M_S$ input subcarriers, and a last one of the DCT decoder stages provides the $K_u$ output subcarriers as its $M_1$ output subcarriers.

13. The receiver circuit of claim 12, wherein at least one DCT decoder stage in the signal processing chain comprises a direct-mapping DCT decoder stage that is configured to form M output subcarriers by selecting a length-M ordered sequence from 2M input subcarriers, which are known to be formed as a length-2M ordered sequence the length-M ordered sequence interspersed with a time-reversed and mirrored version of the length-M ordered sequence.

14. The receiver circuit of claim 12, further comprising a parallel-to-serial converter circuit configured to convert the $K_u$ output subcarriers into a corresponding serial stream, and a processing circuit configured to obtain information symbols of interest from the serial stream.

15. A method for use in a receiver circuit configured to process a received Single-Carrier Discrete Cosine Transform (SC-DCT) OFDM signal, said method comprising:

removing a cyclic prefix or zero padding from N input subcarriers from the received SC-DCT OFDM signal;

de-mapping said N input subcarriers from the received SC-DCT OFDM signal to $K_u$ output subcarriers, after removing said cyclic prefix or zero padding, according to the formula $K_u = N/2^S$, wherein S indicates the integer number of DCT decoder stages included within a signal processing chain of the receiver circuit, wherein $S \geq 1$; and wherein said de-mapping includes, in each of two or more DCT decoder stages included in the receiver circuit i, where i=S, S−1, ..., 1, and S>1, generating $2M_i$ output subcarriers from $2M_i$ input subcarriers, based on mapping even-numbered or odd-numbered ones of the $2M_i$ input subcarriers as said $M_i$ output carriers, in dependence on an even/odd shift control signal applied to the stage, and further comprising generating said $M_i$ output carriers based on performing a DCT on the $2M_i$ input subcarriers, followed by performing an IDCT on the results obtained from said DCT.

16. The method of claim 15, further comprising, in at least one said DCT decoder stage in the signal processing chain, implementing a direct de-mapping, based on forming M output subcarriers by selecting a length-M ordered sequence from 2M input subcarriers, which are known to be formed as a length-2M ordered sequence of the length-M ordered sequence interspersed with a time-reversed and mirrored version of the length-M ordered sequence.

17. The method of claim 15, further comprising converting the $K_u$ output subcarriers into a corresponding serial stream, and obtaining information symbols of interest from the serial stream.

* * * * *